United States Patent
Hellerstein et al.

(10) Patent No.: US 6,836,894 B1
(45) Date of Patent: Dec. 28, 2004

(54) SYSTEMS AND METHODS FOR EXPLORATORY ANALYSIS OF DATA FOR EVENT MANAGEMENT

(75) Inventors: Joseph L. Hellerstein, Ossining, NY (US); Sheng Ma, Ossining, NY (US); Steven S. Demion, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/359,874

(22) Filed: Jul. 27, 1999

(51) Int. Cl.[7] .................................................. G06F 9/46
(52) U.S. Cl. ..................... 719/318; 719/310; 719/311; 345/619; 345/762
(58) Field of Search ............................... 709/318, 310, 709/100, 328

(56) References Cited

U.S. PATENT DOCUMENTS

| | | | | |
|---|---|---|---|---|
| 4,828,500 A | * | 5/1989 | Seidel et al. | 434/247 |
| 5,168,554 A | * | 12/1992 | Luke | 395/161 |
| 5,867,229 A | * | 2/1999 | Stevens | 348/722 |
| 5,963,943 A | * | 10/1999 | Cummins et al. | 707/10 |
| 6,057,839 A | * | 5/2000 | Advani et al. | 345/341 |
| 6,118,936 A | * | 9/2000 | Lauer et al. | 395/200.53 |

OTHER PUBLICATIONS

D.A. Rabenhorst, Interactive Exploration of Multidimentional Data, Feb. 1994, Proceedings of the SPIE Symposium on Electronic Imaging, 17 pages.*

D.A. Rabenhorst, "Interactive Exploration of Multidimensional Data," Proceedings of the SPIE Symposium on Electronic Imaging, 17 pages, Feb. 1994.

M.O. Ward, "XmdvTool: Integrating Multiple Methods for Visualizing Multivariate Data," Visualization '94, 6 pages, Oct. 1994.

M. Derthick et al., "An Interactive Visualization Environment for Data Exploration," KDD'97, 8 pages, 1997.

* cited by examiner

*Primary Examiner*—Thomas Lee
*Assistant Examiner*—The Thanh Ho
(74) *Attorney, Agent, or Firm*—Rafael Perez-Pineiro; Ryan, Mason & Lewis, LLP

(57) ABSTRACT

Systems and methods are provided for exploratory analysis of event messages. The invention includes a parsing engine to translate textual messages into structured event data, a selection and control engine (SCE) to provide data management and communication channels for a set of analysis methods, and viewers to support different kinds of analysis methods. The invention further includes a mechanism for viewers to exchange information, a mechanism for interactively and iteratively refining parsing rules, and a mechanism to visualize events through event graphs.

20 Claims, 21 Drawing Sheets

USAGE SCENARIO

FIG. 7

| COMMAND | INPUTS | OUTPUTS | NOTES |
|---|---|---|---|
| CreateELog | FileName | EStructuredLog | (1) |
| GetAttributeList | EStructuredLog | SetOfAttribute | |
| GetSymbolTable | Attribute | SetOfSymbolTableEntry | |
| | EStructuredLog | | |
| GetData | SetOfMsgID | SetOfMessage | |
| | SetOfAttributeConstraint | SetOfDataRow | |
| | EStructuredLog | SetOfControlValue | |
| GetDataSummary | SetOfMsgID | AttributeCount | |
| | SetOfAttributeConstraint | | |
| | EStructuredLog | | |
| GetControlData | EStrucutredLog | SetOfControlData | |
| UpdateControlData | ControlData | | (1) |
| | SetOfAttributeConstraint | | |
| | EStructuredLog | | |
| GetParsingRule | MessageID | ParsingRule | |
| SetParsingRule | NewParsingRule OldParsingRule | | |
| ConstrainELog | SetOfAttributeConstraint | | (1) |
| | EStructuredLog | | |
| UpdateViewer | SetOfViewerID | | |
| CloneELog | EStructuredLog | EStructuredLog | (2) |

NOTES
(1) - UPDATES ALL VIEWERS
(2) - CREATES A NEW EStructuredLog

FIG. 8B

METHODS OF GENERIC VIEWER

| METHOD | INPUT | DESCRIPTION |
|---|---|---|
| ConstructView | ELog ViewerContext | DISPLAY INFORMATION IN ELog IN A VIEWER-SPECIFIC WAY WITH VIEWER PROPERTY DESCRIBED IN ViewerContext |
| SelectFilterData | SetOfAttributeConstraint<br>IsGlobal<br>IsSelect | SELECT OR FILTER A SET OF DATA |
| GetElogID | | GET ELog ID FROM ViewerContext |
| SetElogID | | SET ELog ID |
| GetViewerID | | GET VIEWER ID FROM ViewerContext |
| SetViewerID | | SET VIEWER ID |

SelectFilterData

FIG. 9

COMMUNICATION EVENTS AMONG SCE, VIEWER AND USER

| SOURCE | TARGET | NAME | OCCURRENCE |
|---|---|---|---|
| SCE | Viewer | INITIALIZE | WHEN THE VIEWER IS INITIALIZED |
| SCE | Viewer | UpdateViewer | WHEN THE EStructuredLog IS UPDATED |
| Viewer | SCE | ConstraintELog | WHEN A VIEWER PERFORMS A GLOBAL SELECTION/FILTERING OPERATION |
| Viewer | SCE | GetData | WHEN A VIEWER NEEDS DATA |
| USER | Viewer | BUTTON | WHEN A VIEWER BUTTON IS PRESSED |
| USER | Viewer | ITEM | WHEN ITEMS ARE SELECTED (LISTS, PIXELS, MESSAGES, ETC.) |

A VIEWER PROCESS WHEN SCE/INITIALIZE EVENT IS RECEIVED

A VIEWER PROCESS WHEN SCE/UpdateViewer EVENT IS RECEIVED

Viewer/ConstraintELog EVENT

VIEWER/GetData EVENT

USER BUTTON = "SELECT" OR "FILTER"

USER BUTTON = "SELECT" OR "FILTER"

USER BUTTON = "SELECT" OR "FILTER"

USER BUTTON = "RULE EDITOR"

SYSTEMS AND METHODS FOR EXPLORATORY ANALYSIS OF DATA FOR EVENT MANAGEMENT

FIELD OF THE INVENTION

The present invention relates generally to management of distributed systems and more specifically to visualizing and analyzing events with disparate formats and with patterns on different time scales.

BACKGROUND OF THE INVENTION

As networked systems and applications became increasingly critical to the success of a business, effectively managing networked systems and applications becomes extremely important. In order to monitor networked systems and applications, a system manager (or a user) needs to monitor critical activities of systems and applications. One commonly used approach is to set up the monitored system or application to generate an event message when an important activity happens. This message, which can be generated by a device, an application or a system, is usually saved in a log file. For example, a router keeps a router log to track the status of each port and slot in the router. A networked system records important network activities, such as "cold start," "router port up," "link up," etc., in a system log file. Other examples include DHCP (Dynamic Host Configuration Protocol) servers, Lotus Notes Servers, and Web Servers.

Because logs record critical activities, they are very important for managing systems, devices and applications. However, extracting information from a log file is often difficult. First, log files are of ten quite large, often containing thousands of events per day. Indeed, a web server can serve millions of requests every day, and for each, there may be a log file entry.

A second difficulty with processing log files is that entries have different formats. For example, a HTTP (HyperText Transport Protocol) server log contains byte counts requested by a user. A router log reports events for each port and slot. As a result, an unstructured textual format is used by most log files. Although the textual format is flexible in length, format and meaning, it hinders the use of many analysis tools which can only analyze structured numerical data. To deal with this difficulty, a parsing mechanism is typically introduced to translate a textual message into structured data for analysis. However, there remains the problem of determining the parsing rules. Because a textual message contains a variety of information, the process of defining parsing rules has an interactive and iterative nature. That is, a user may want to see additional information as he analyzes the data Conventionally, this iterative process is done manually in an ad-hoc fashion.

Third, log entries have varied information content. Some entries may include information about thresholds (e.g., if the event reported is a threshold violation). Other entries may report information specific to events, such as the port on which a disconnect occurred. This situation creates the following quandary. To provide uniformity in the analysis of log data, one needs to have common information for all events. Yet, to extract the full scope of information from event logs, variability in information content must be allowed.

A consequence of the foregoing observations is that event data needs to be viewed in many ways so as to account for its diversity of formats and content.

A first viewing approach, and the most commonly used approach, is to view the raw log file via a text editor. In this way, a user reads event messages line by line, and can read each message in detail. Clearly, this approach places emphasis on each individual event message. Although this is an important step for understanding event messages and diagnosing a problem, this approach can hardly be used to analyze the relationship among events. For example, an event pattern may be that a group of events happen periodically within a one hour period. In addition, this approach is not very efficient and effective for analyzing a large volume of events which may easily consume several megabytes per day.

A second class of viewing approaches is to aggregate events and analyze summary information. Summarization is one popular technique in this class. That is, event counts are calculated and reported by defined categories, such as event counts by hostname, by event types and by time. Clearly, through summarization and categorization, a large volume of original textual data is reduced to a small amount of summarized numbers for each defined categories. This greatly improves the efficiency and eases the scalability issue of the first approach. However, summarization loses details of the original event messages. This is because the summarization depends on the defined categories. The information which is not categorized is therefore invisible. In addition, information of event patterns (e.g., event A happens periodically) and relationships among events (e.g., a group of events tends to happen together) are lost because of aggregation.

A third viewing approach is to use graphical displays, referred to as event plots. One example of a two-dimensional event plot may be a plot in which an event message is represented by a point whose horizontal axis corresponds to time of the event and vertical axis corresponds to host ID of the event. In this way, thousands of events can be displayed in one screen, and the relationship among events can be visually apparent. However, this approach can not reveal the detailed information which was not parsed from a message.

Thus, there are three conventional, but mutually exclusive, different ways to analyze event logs. Each of them has its own advantages. Directly reading the textual messages provides the most detailed information of event messages. The aggregated event analysis provides a nice scaling property and shows summarization. The event plot can reveal event patterns and relationship among events.

Most available products for analyzing a log file specialize on one type of log file. For example, there are many products on the market aiming to analyze HTTP log files (see Web Trend http://www.webtrends.com; Hit List:http://www.marketwave.com; ARIA: http://www.ANDROMEDIA.com; and Web Tracker: http://www.cqminc.com. All of these special log analyzers only support summarization analysis. None of them can be used to visualize event messages and/or see original messages.

On the other spectrum, there are many general graphical tools, such as Diamond, Data explorer, SAS, PowerPlay, etc. These tools aim to support either graphical analysis of numerical data, such as Diamond, Data explorer, SAS, etc., or aggregated level summarization such as PowerPlay and other OLAP (On Line Analytical Process) products. However, none of them provide both types of analysis. In addition, these tools usually only take structured data as inputs and can not handle textual data directly.

Therefore, it would be highly desirable to provide systems and methods which integrate two or more of these different analysis approaches, thus providing a user with the capability and flexibility to perform multiple types of analysis on raw data for event management purposes.

SUMMARY OF THE INVENTION

The present invention provides systems and methods for providing exploratory analysis of data for event management. In one aspect, the invention provides for a methodology and related system referred to hereinafter as an "event browser" that provides an integrated environment for analysis of a large volumes of semi-structured or non-structured data, such as event logs.

In an illustrative embodiment of the invention, the event browser advantageously provides: (1) scalable analysis of large volumes of unstructured data with diverse content and data formats; (2) an architecture to support multiple types of views and analyses of such data; (3) mechanisms to support the iterative refinement of the information in the raw data that is included in the visualization and analysis environment; (4) several specific viewers for analysis of event data.

An event browser of the invention is implemented in a form which includes certain functional components. These components, as will be explained, may be implemented as one or more software modules on one or more computer systems. To deal with textual messages directly, the event browser of the invention integrates a parsing mechanism or engine and an analysis tool in one package. The role of the parsing engine is to translate an event message into a set of attribute values defined by parsing rules. For example, if parsing rules define information about host name, event type and time stamp, an event message is translated into a tuple of {host name, event type, time} through the parsing. In other words, the parsing engine translates semi-structured or non-structured textual data into structured data. The analysis tool, therefore, does not need to worry about the detailed message format, and can focus on analysis and the GUI (graphical user interface) to an end-user. As a result, the detailed textual format of a log file is preferably hidden from an end-user, until he wants to see it. This allows users to analyze log files with different formats in a unified and simple way.

Graphical visualization is a powerful tool for analyzing data in general. Although graphical representation of numerical data has been explored intensively, how to visualize a large volume of textual event messages has not been addressed in any conventional products. Advantageously, according to the invention, an event graph is provided to visualize a large amount of event messages. To understand what an event graph is, we recall that since a textual event message is translated into a set of attribute values through a parsing engine, an event can be represented by a tuple as {host name, event type, time stamp}. Here, host name and event type are strings for host and event type identification. Because the analysis is usually more efficient in handling numbers rather than strings, we further assign a unique number called ID to a host name and an event type, respectively. We maintain the correspondence between a name and its assigned ID in an attribute table. For example, host A may be assigned host ID 1. Event type B may be assigned to event type ID 3. A host attribute table thus is used to maintain the correspondence between host A and its ID 1. Likewise, the event attribute table maintains a link between event type B and its ID 3. Therefore, equivalently, the tuple {host name, event type name, time} for an event can be represented by {host ID, event type ID, time}. An event graph is therefore a plot to show these tuples for events. For example, events can be plotted on a two-dimensional graph using host ID and time as two axes. Clearly, the advantage of an event graph is that several days' events can be shown in one plot. Furthermore, through standard visualization techniques, a user can browse events from coarse to fine time scales and can zoom into interesting areas by rubber-band techniques. It is to be understood that rubber-banding may include dragging a rectangle over points of interest in order to then perform operations in accordance therewith. This greatly improves the navigation capability of a user.

To take advantages of different analysis techniques, an event browser of the invention provides an extensible architecture to preferably integrate event graphs ("plot viewer"), event summarization ("attribute viewer"), detailed message ("message viewer") and other possible viewers. Further, the event browser provides an infrastructure for exchanging information amongst the viewers. Each of these three viewers has its own advantages for viewing and manipulating data. The attribute viewer of the invention is good at summarization and query-type operations. From the attribute viewer, a user can conveniently select all events associated with a set of hosts and event types. It also summarizes events by their host types and event types and thus provides summarization of a log to a user. The plot viewer of the invention can display a large amount of individual events in one window. Therefore, a user can view event relationships and discover event patterns. In addition, through the use of standard visualization techniques, a user can zoom in for details and zoom out for a larger view, and rubber-band to select "interesting" events. The message viewer of the invention provides the capability to view a set of raw event messages. This enables a user to further see detailed and application specific information which may be very difficult to parse out or not worth parsing out, but may be needed for diagnosis.

The event browser of the invention not only preferably provides these three individual viewers, but also combines and coordinates these viewers for analyzing events. For example, a user can very easily select a set of interesting events for a set of hosts and event types from the attribute viewer by highlighting these hosts and event types, then use the plot viewer to see the relationship among the selected events. From the plot viewer, he can further select a small set of suspicious events by dragging a rubber-band, and displaying the original textual messages related to the selected events in the message viewer. Further, by highlighting, coloring, or otherwise selecting events in one viewer, he can cause to have similarly modified presentations of these events in other viewers. We refer to this capability as "coordinated views." Accordingly, the event browser provides a novel event visualization and analysis platform and can assist a user in discovering "useful" information which can not be revealed by any conventional tool.

In another aspect of the invention, the event browser provides interactive and iterative refinement of parsing rules. As previously mentioned, the role of a parsing engine is to pick out the important information from textual messages and translate the unstructured data into structured data for analysis. Therefore, the ability of analysis tools highly depends on what is parsed. In practice, finding the right information to parse out from a message is not an easy task, because a raw message contains various levels of details and a user certainly does not want to be flooded by this information. Usually, at first, a user is only interested in the most important information, such as host name and event type. But as the user analyzes the data, the user may want more details or other types of information, such as destination or severity level. Therefore, the parsing rule needs to be redefined to include additional information. Conventionally, the process of defining parsing rules is done in an isolated way. That is, if a user needs more information, the user has to use a separate tool to edit the parsing rule file, and then rerun the parsing and the analysis. Since the event browser integrates parsing engine and analysis, it provides a feedback loop for a user to modify parsing rules in an integrated environment.

Several extensions are possible to the systems and methods of the invention. For example, the plot viewer may not only provide a two dimensional plot, but also a three dimensional plot. Also, the attribute viewer may not only support a flat attribute structure, but also a hierarchical structure. As attributes can be organized in a more efficient hierarchical structure, an additional viewer can be designed based on the attribute viewer. The additional viewer to support hierarchical attribute structure may include an additional interface to reflect the hierarchical structure of attributes and additional methods to support OLAP operations (e.g., drill-down/up/through) to take the advantage of the hierarchical structure. Further, common functions, such as string searching, in a text editor can be incorporated into the message viewer. Still further, other types of analyses and analysis interfaces, such as association discovery and clustering algorithms in data mining, can be implemented as an additional viewer and work together with the plot, message and attribute viewers. Even further, because of the architecture of an event browser, functional components of the event browser such as, for example, a parsing engine, selection and control engine (SCE) and viewers, can run on physically different computers. To achieve this, the communication interface among these parts may be extended to support an unreliable networked communication environment.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 7 illustrates exemplary methods used by a selection and control engine according to the invention;

FIG. 8B illustrates exemplary methods used by a viewer according to the invention;

FIG. 9 illustrates exemplary communication events among a user, a viewer, and a selection and control engine according to the invention;

DETAILED DESCRIPTION OF PREFERRED EMBODIMENTS

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., keyboard, mouse, etc., for inputting data to the processing unit, and/or one or more output devices, e.g., CRT display, printer, etc., for providing results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 1:
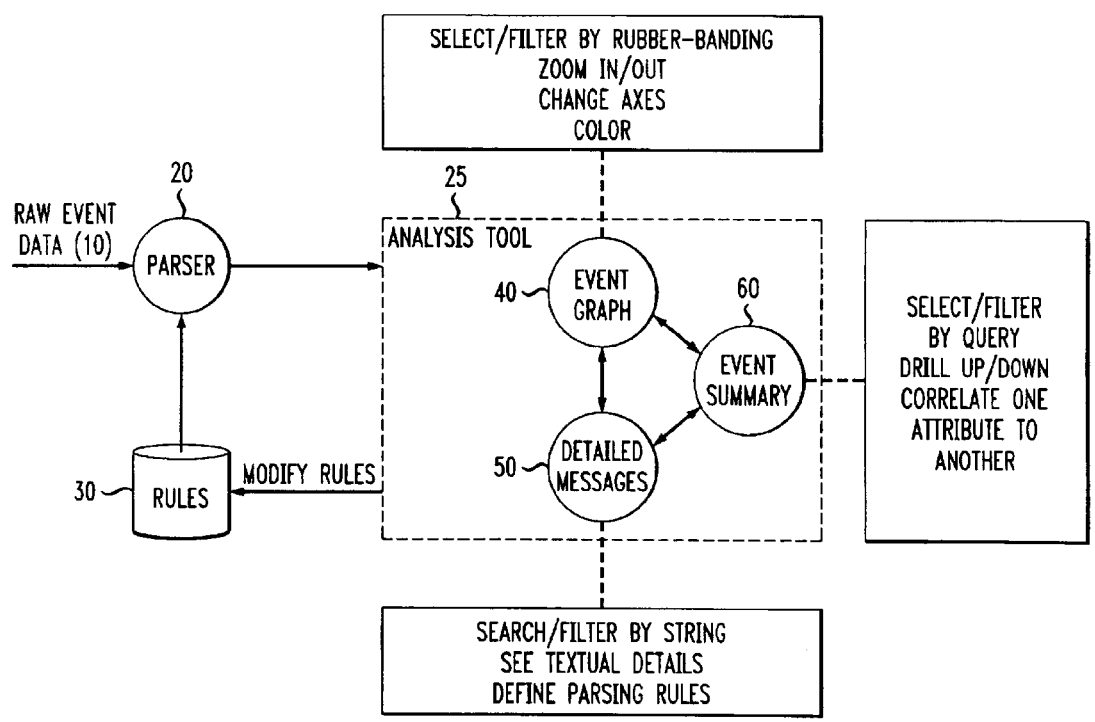
FIG. 1 illustrates an exemplary data flow of an event browser according to the invention.

In order to illustrate the embodiment presented in this detailed description, a usage scenario of an event browser of the invention is described in the context of FIG. 1. Raw event data represented as a log file 10 is first parsed by a parser 20 based on defined parsing rules 30. Then, a user interactively employs an analysis tool 25 to analyze the parsed event data. The analysis tool supports three classes of analysis and viewing approaches: event graph 40; event summarization 50; and detailed message 60. Various exemplary functions performed by the classes of approaches are listed in conjunction with each approach. These functions will be explained in detail below. Since these three classes of approaches can exchange information with each other, a user can start with any approach to manipulate data (e.g., selection or filtering of data), and change to other approaches to analyze data. For example, a user may first use event graph approach 40 to see event patterns and select an "interesting" pattern by rubber-banding, then use event summarization approach 60 to summarize information about this event pattern, and finally see detailed messages 60 of selected events, if needed. In the course of analysis, if a parsing rule needs to be further refined, a user can modify parsing rules 30 and continue the analysis process.

Figure 2A:
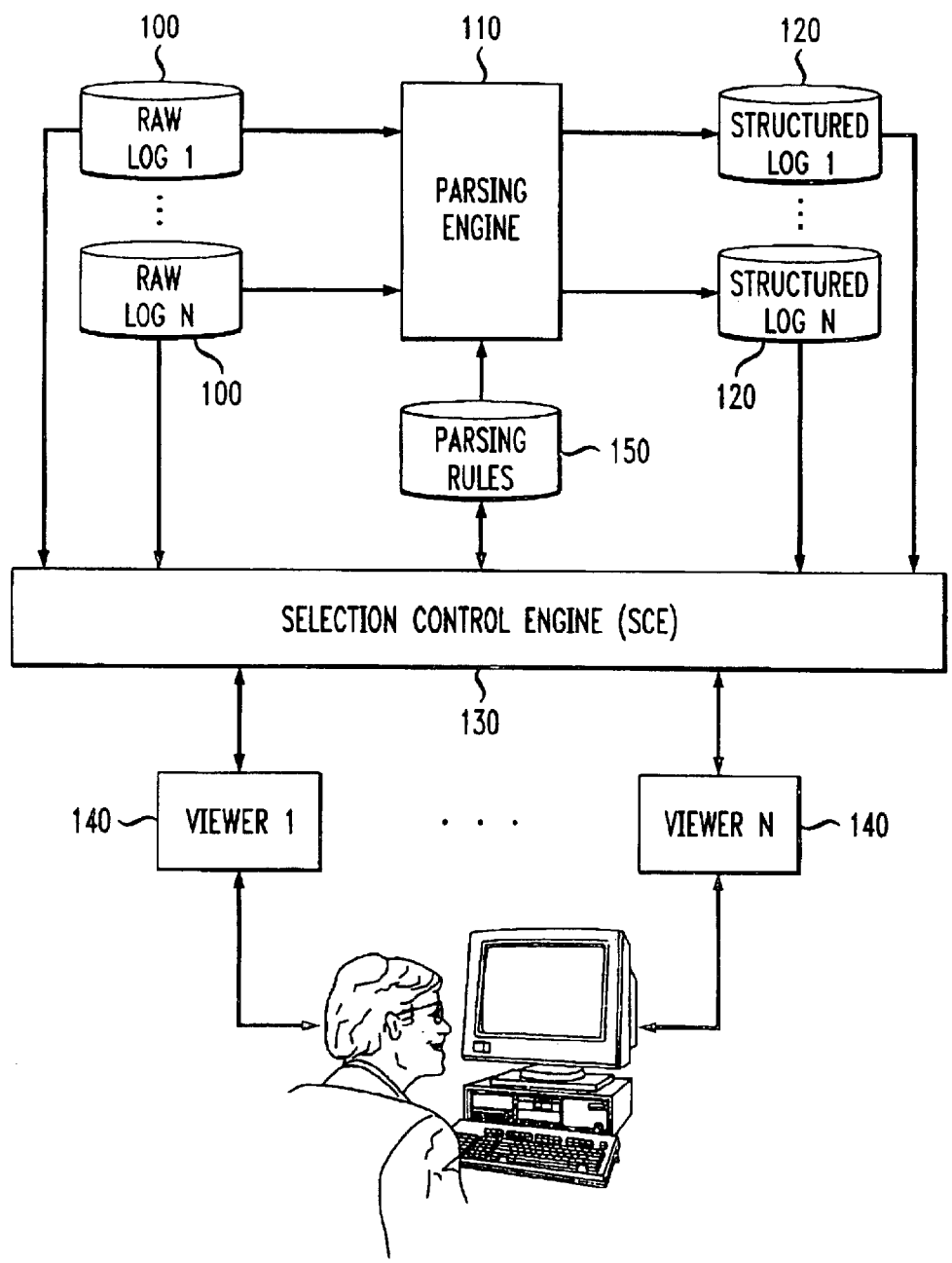
FIG. 2A illustrates an exemplary architecture of an event browser according to the invention.
Figure 2B:
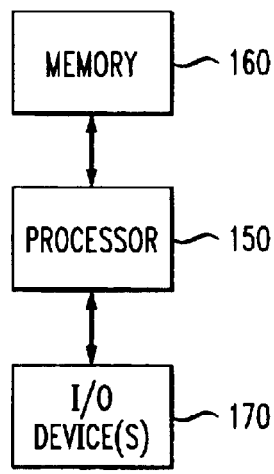
FIG. 2B illustrates an exemplary hardware implementation of an event browser according to the invention.

FIG. 2A illustrates an exemplary architecture of an event browser according to the invention. As shown, the event browser includes three main components: (a) parsing engine 110; (b) a selection and control engine (SCE) 130; and (c) viewers (1 through N) 140. The role of the parsing engine 110 is to respectively translate raw textual messages (1 through N) 100 into structured logs (1 through N) 120 according to defined parsing rules 150. As will be explained, the SCE is essentially the center of operations of the event browser. The SCE 130 takes in raw logs 100, structured logs 120, and parsing rules 150, and stores them in its local storage memory (FIG. 2B). The SCE 130 maintains and manages these data sources, and presents them to different viewers 140. It also provide a communication channel for viewers to exchange information. The viewers 140 provide analysis interfaces to a user. A viewer usually supports one analysis technique, which can be an event graph approach 40, an event summarization approach 60, or a detailed message analysis 50, or some other analysis technique. Through a viewer, a user interactively manipulates (e.g., selects or filters) data and possibly modifies parsing rules 150 through a viewer-defined manner.

Referring now to FIG. 2B, a block diagram is shown of a hardware implementation of an event browser according to the invention. It is to be appreciated that such an implementation reflects a computer system on which the various components (e.g., parsing engine, SCE, viewers) may be loaded and executed to provide a user with the advantages associated with the invention. As previously mentioned, the invention may be implemented on one or more computer systems which share the execution of one or more processes or execute individual processes associated with the methodologies of the invention. Each computer system includes a processor 150 coupled to a memory 160 and I/O device(s) 170. The processor 150 performs the functions associated with the various components of the event browser running therein. The memory 160 is used by the processor for performing such functions and for storing, e.g., raw log data, structured log data, parsing rules, etc., and results of the processes. The I/O devices may include one or more data input devices (e.g., keyboard, etc.) for inputting data, if needed, and/or one or more data output devices (e.g., display) for presenting a user with results associated with the functions performed in accordance with the various components, e.g., viewers. For example, a display may present a user with a graphical user interface for viewing such results.

We now describe the detailed structure of each component in FIG. 2A.

Figure 3A:
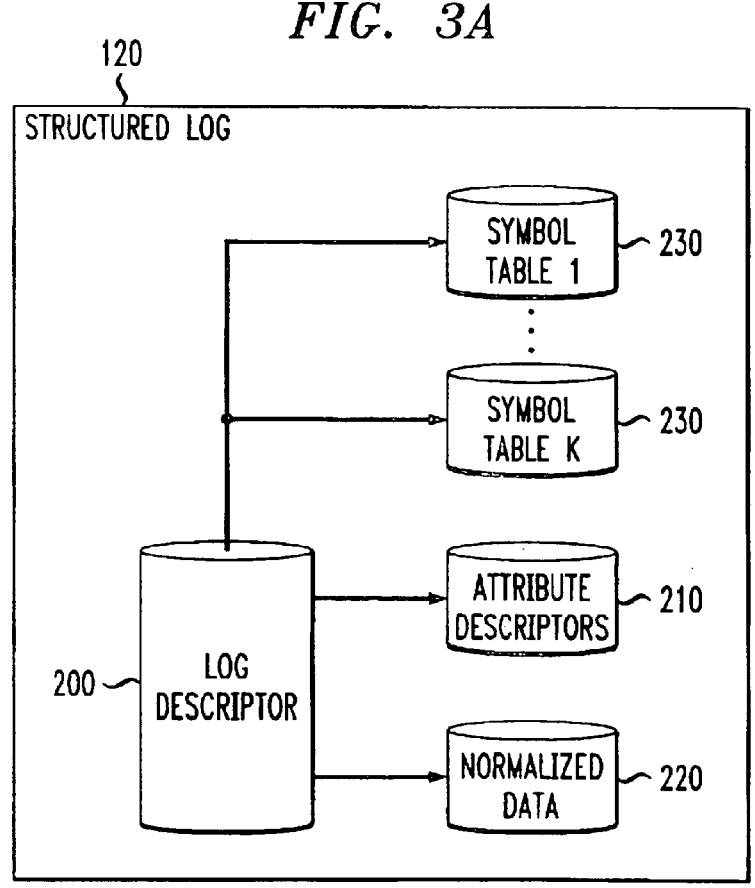
FIG. 3A illustrates an exemplary data structure of a structured log according to the invention.

FIG. 3A specifies the data structure of a structured log 120. Each log file is fully described by a log descriptor 200, which includes pointers to a set of attribute or symbol tables (1 through K) 230, attribute descriptors 210 and normalized data 220. An attribute table 230 is a table with two columns: one for symbol names and the other for assigned IDs. For example, a hostname table contains information about host names and their corresponding IDs. An event type table contains information about names of event types and their corresponding IDs. Normalized data 220 is a data matrix. Each row of it corresponds to attribute values of a message determined by the parsing rule. In a data matrix, a string name is replaced by its corresponding IDs defined in the corresponding attribute table. For example, normalized data 220 usually provides host ID and event type ID for each event. The real hostname and event-type name of these IDs can be found in the hostname symbol table and the event-type symbol table. Attribute descriptors 210 define the organization of normalized data 220, and maintain the correspondence between the columns of normalized data 220 and the associated symbol tables (1 through N) 230. For example, a descriptor may define that the first column of normalized data is message ID, the second column is host ID, etc.

Figure 3B:
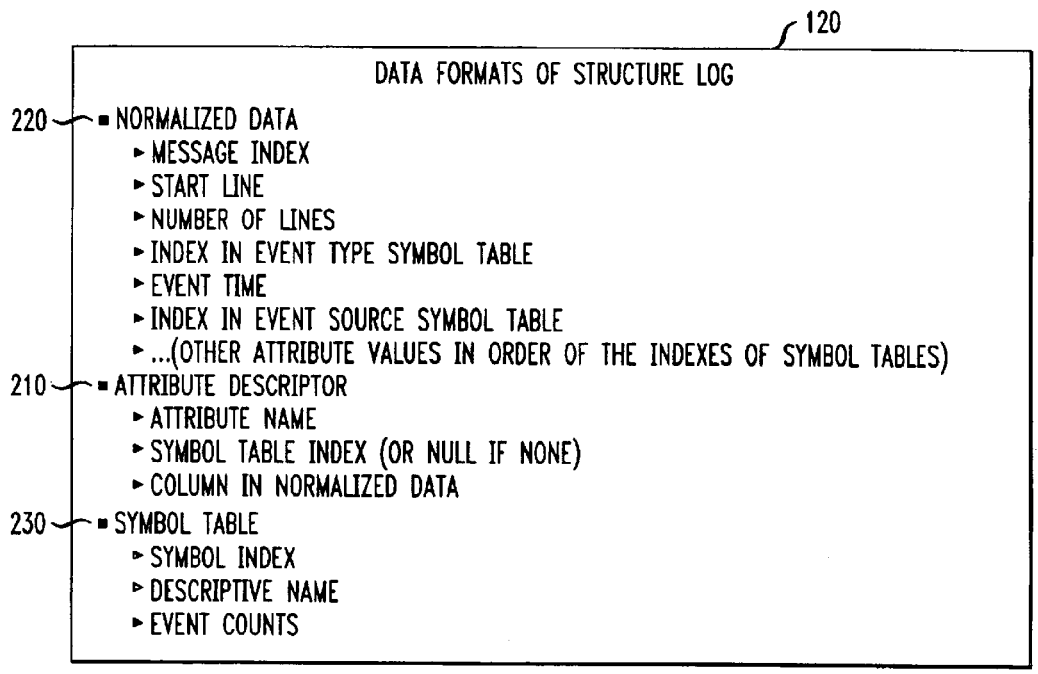
FIG. 3B illustrates exemplary details of a data structure used in a structured log according to the invention.

FIG. 3B provides a detailed description of the data structure used in the structured log 120. Normalized data 220 has the following attributes: message index, start line (i.e., the starting line of an event in the raw log file), number of lines (i.e., the number of lines of the original message), event type ID, time stamp, host ID, etc. An attribute descriptor 210 maintains the correspondence among attribute name, its symbol table (null if none), and its column in normalized data. A symbol table 230 stores the information about values (or items) of an attribute. It has a descriptive name of an attribute value (e.g., host name), assigned ID, and event counts.

Figure 4:
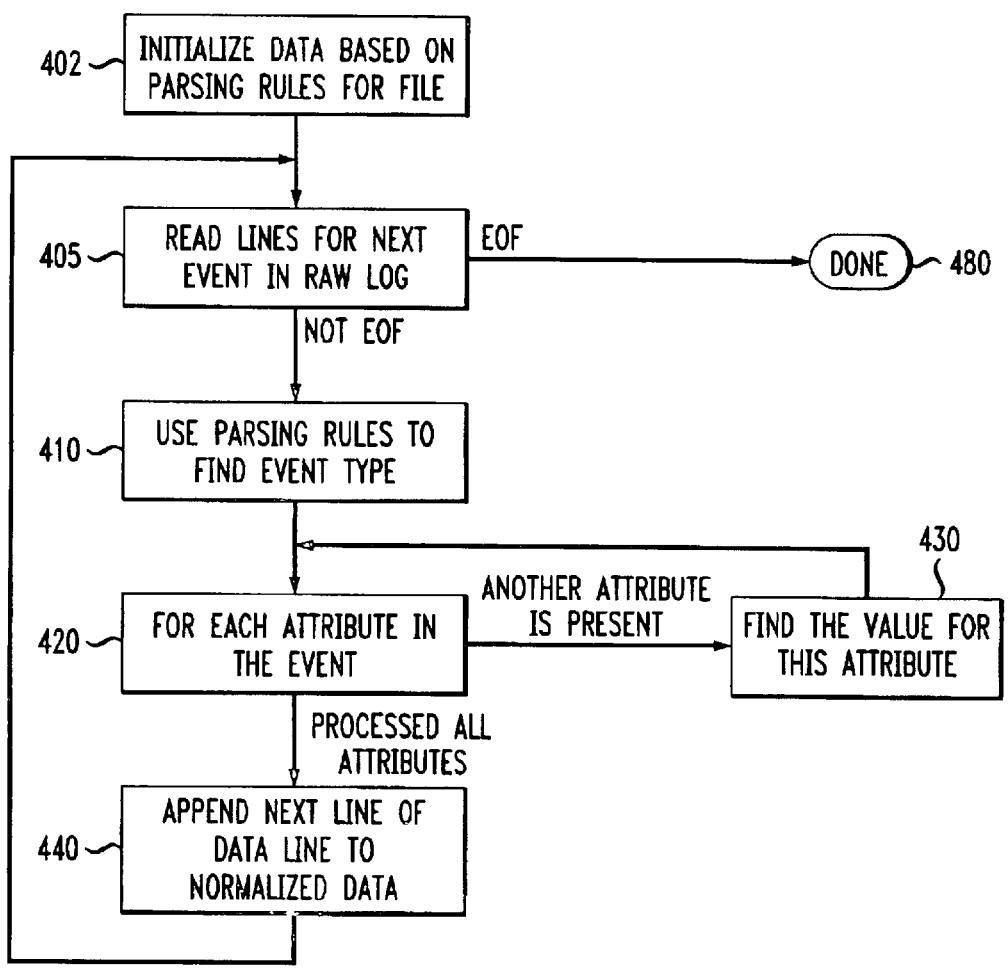
FIG. 4 illustrates an exemplary process flow of a parsing engine according to the invention.

FIG. 4 illustrates an exemplary process flow of parsing engine 130. First, in step 402, the parsing engine initializes data and reads in parsing rules from memory. The parsing rules may be previously stored in memory 160 (FIG. 2B) or entered interactively by a user via user interface 170 (FIG. 2B) and stored. Then, in step 405, the parsing engine reads lines for the next event in the raw log. If the end of the log file (EOF) is not reached, the engine 130 finds the event type from these lines for this event using parsing rules, in step 410. For each attribute defined in the parsing rules for this event type (block 420), the engine finds the corresponding value from the lines in step 430. After the engine finds all attributes of this event, it appends the values to normalized data matrix, in step 440. The parsing engine repeats this process for all messages in the event log. When the end of the log file is reached, the parsing process is complete (block 480).

Figure 5:
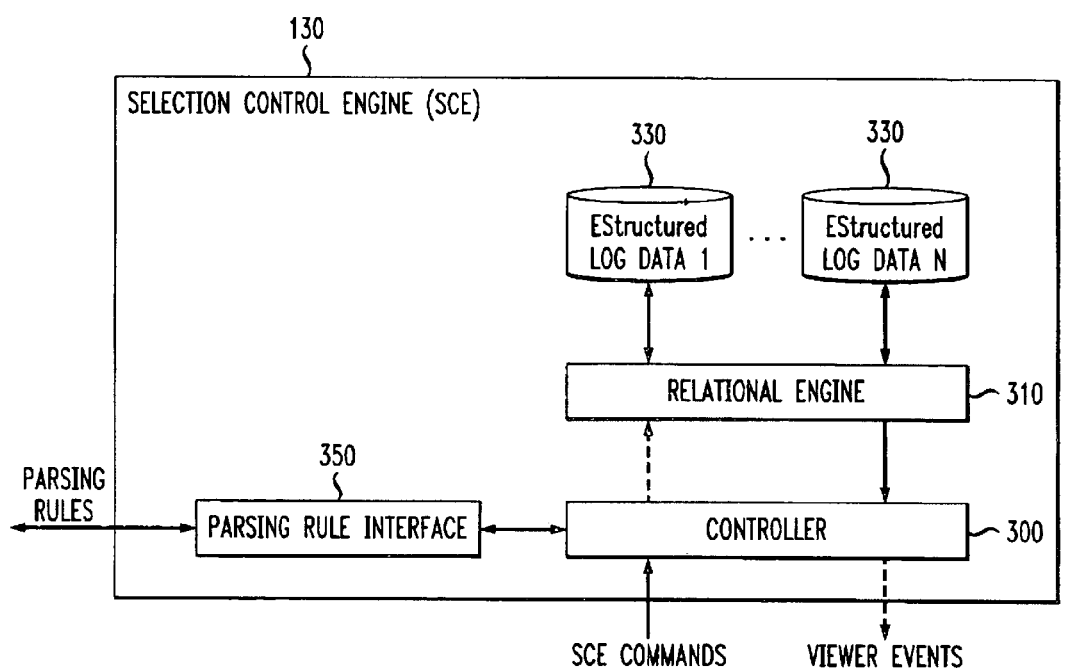
FIG. 5 illustrates an exemplary selection and control engine according to the invention.

FIG. 5 illustrates an exemplary selection and control engine (SCE) 130 and functions associated therewith according to the invention. Extended Structured log data (Elog) 330 stores all data read in by the SCE. The SCE may handle several log files, and create an Elog for each log file. The relational engine 320 is responsible for reading/writing the data from/to destination Elog according to certain constraints. Examples of constraints may be: (i) specification of only attributes of interest; (ii) specification of a time range of interest; and/or (iii) specification of the number of events to be analyzed. The controller 300 is used by the SCE to communicate with viewers. The controller sends data and events to the viewers and receives events from viewers. An event-driven approach is preferably used for communication between viewers and the SCE. The advantage of this approach is that viewers and the SCE can operate asynchronously. Furthermore, adding additional viewers becomes easy because a new viewer is only required to support a couple of communication events in order to be integrated with other viewers. There are two types of events possibly generated from a viewer. One is related to manipulation of data. When the controller receives and interprets such events, it calls relational engine 310 to further process the request. The other type of events is manipulation of parsing rules. Such an event passes control to a parsing rule interface 350, which is responsible for reading/writing parsing rules 150.

Figure 6A:
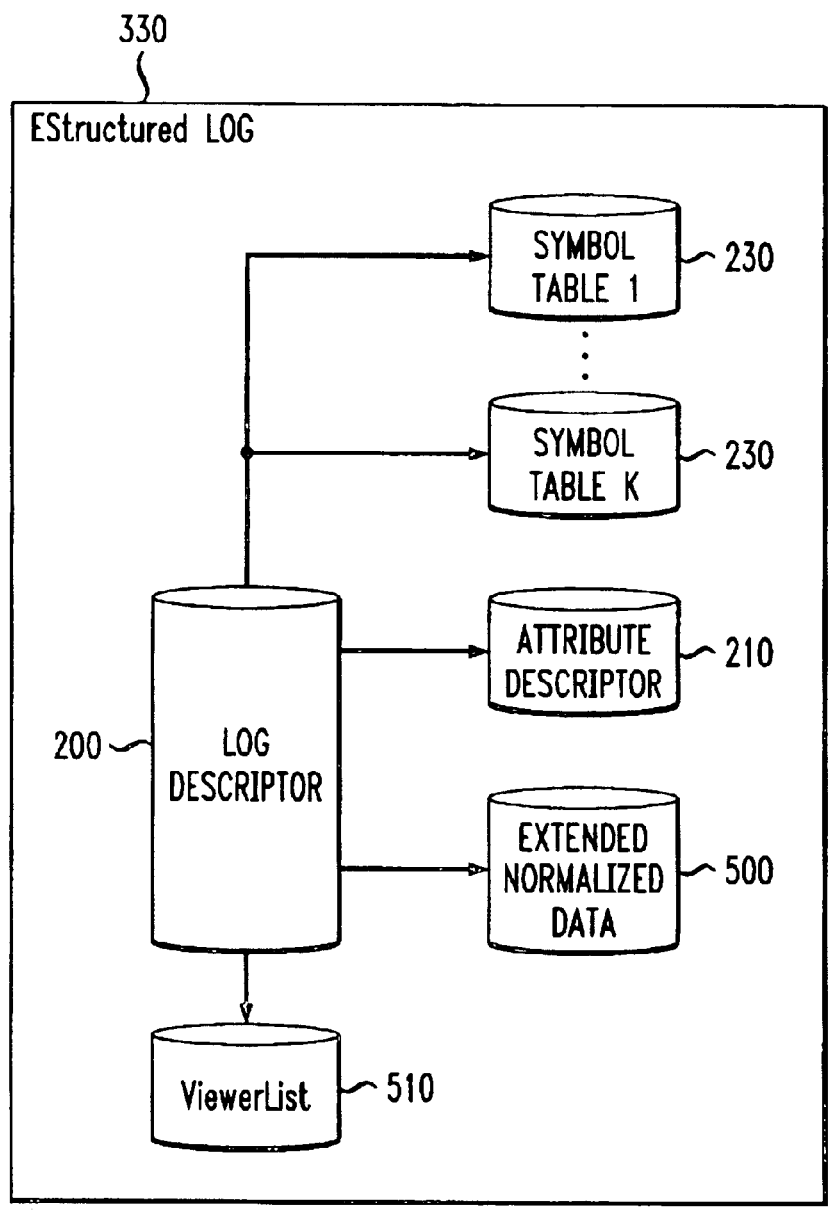
FIG. 6A illustrates an exemplary data structure of an extended structured log according to the invention.

FIG. 6A illustrates an exemplary data structure of extended structured log 330, which is very similar to structured log 120, but adds new entries for control purposes. Viewer List 510 describes which viewers are qualified for reading/writing the event data. Extended normalized data 500 is an extension of normalized data 220. Other components in the Elog 330 are the same as described in the context of FIG. 3A.

Figure 6B:
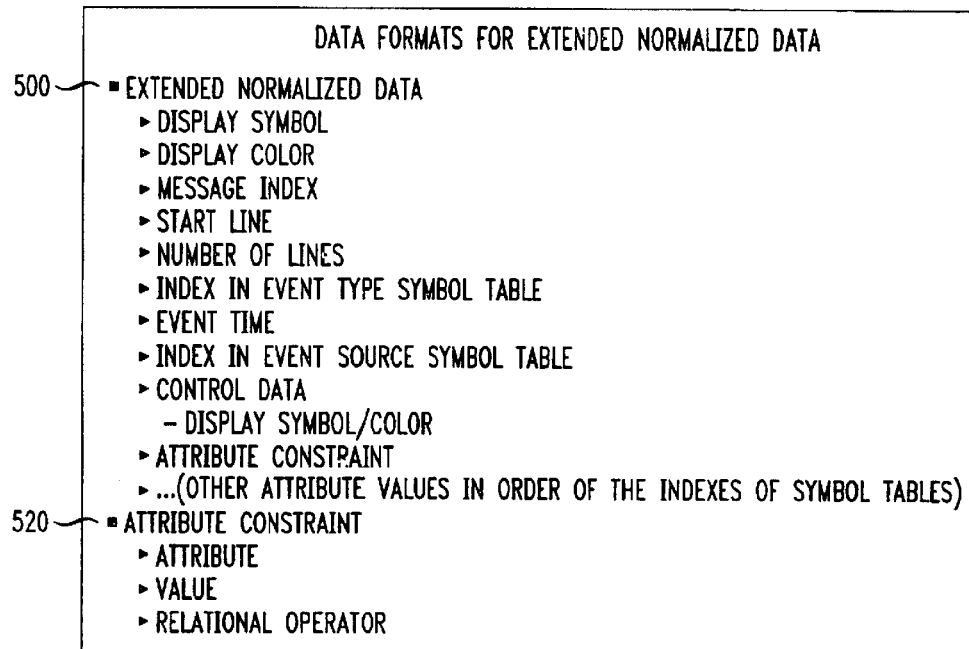
FIG. 6B illustrates exemplary details of a data structure of extended normalized data according to the invention.

FIG. 6B illustrates an exemplary data structure of extended normalized data.

Extended normalized data (500) has all information as in normalized data plus additional control information (e.g., display color) and attribute constraint (i.e., which attribute values are selected or filtered).

FIG. 7 specifies exemplary methods used by the SCE 130. Among them, several "get" operations (e.g., GetAttributeList, GetSymbolTable, GetData, GetSummaryData, GetControlData, GetParsingData) are used to access partial information of data ConstraintElog is used to select/filter data based on provided constraints. This operation modifies the Elog if the operation is indicated as global. Update Viewer is to inform related viewers that data has been changed. The implementation of these methods is straightforward, and will not be further explained.

Figure 8A:
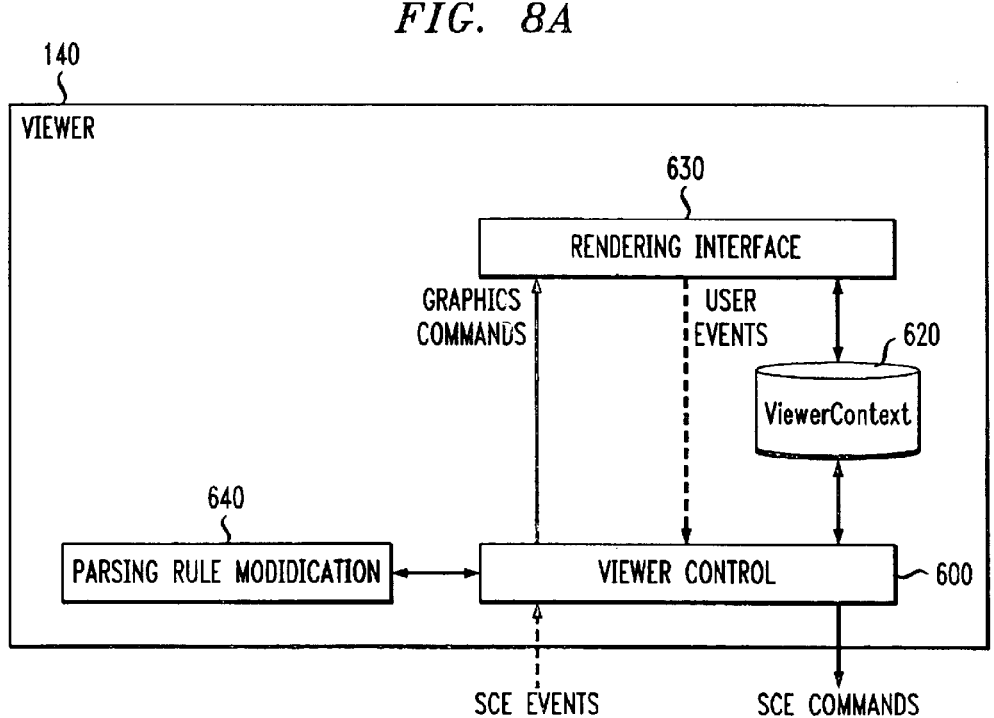
FIG. 8A illustrates an exemplary generic viewer according to the invention.

FIG. 8A illustrates an exemplary generic viewer 140. Rendering interface 630 is the generic user interface of a viewer. Interface 630 defines how information is presented to a user and how a user can manipulate data. Viewer context 620 stores viewer-specific information including information needed to control the appearance of the viewer, viewer identification and Elog ID. It can be changed by a user through rending interface 630. Viewer control 600 serves as interface to the SCE 130. It takes in the SCE events and data, and converts them into graphics commands for rending interface 630 to display. Parsing rule modification module 640 allows the user to modify the parsing rules employed by the parsing engine of the event browser. An exemplary method of modifying the parsing rules will be provided in the context of FIG. 19.

FIG. 8B specifies exemplary methods used by a viewer 140. A viewer includes a ConstructView method to present information in a viewer-specific way. It also includes a SelectFilterData method for a user to either select or filter a set of data. This operation can be global. That is, the operation changes the Elog in the SCE and forces the SCE to send an UpdateViewer event to each registered viewer. The operation can also be local. That is, the operation only changes the results (display) of the originator. The other methods in FIG. 8B are straightforward to one of ordinary skill in the art given their description in the table and need not be further explained.

Figure 8C:
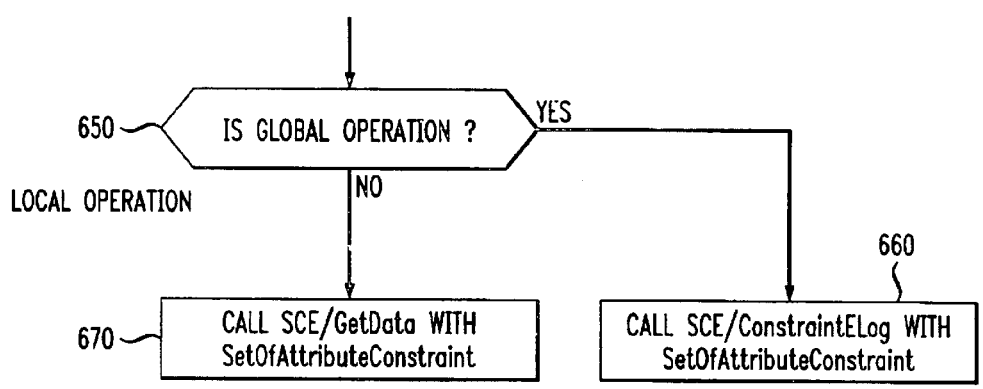
FIG. 8C illustrates an exemplary select/filter data operation according to the invention.

FIG. 8C illustrates an exemplary SelectFilterData operation. If the operation is a global operation (decision block 650), a ConstraintELog event is sent to the SCE. This event causes the SCE to modify Elog according SetOfAttributeConstraint, and inform all related viewers to update their views (step 660). If the operation is local, GetData event is sent to the SCE. This causes the SCE to get the required data and send the UpdateView event to the viewer (step 670).

FIG. 9 illustrates the events communicated among a user, a viewer, and the SCE. The SCE can issue Initialize and UpdateViewer events to cause a viewer to initialize or update its view, respectively. A viewer can issue a GetData event to get data from the SCE, and use ConstraintELog to select/filer a set of data and update other related viewers if it is a global operation. A viewer interacts with a user through interface events, such events indicating that a button is pushed or an item is selected.

Figure 10A:
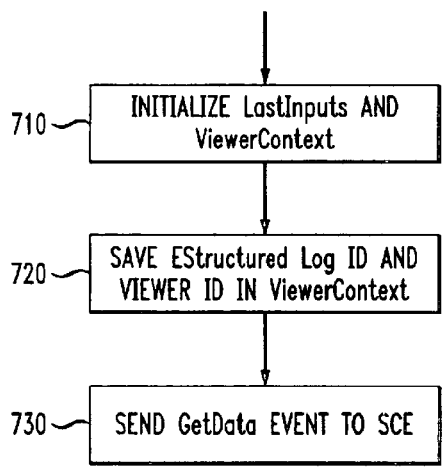
FIGS. 10A and 10B illustrate respective exemplary processes in a viewer when an initialize or update viewer event from a selection and control engine is received by a viewer according to the invention.
Figure 10B:
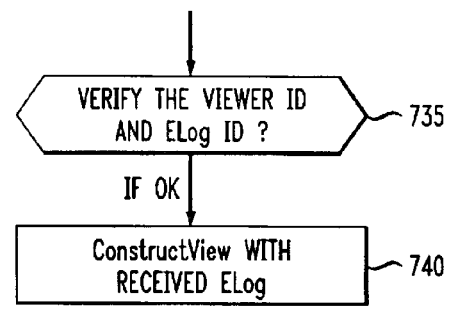

FIGS. 10A and 10B respectively illustrate exemplary processes, from the perspective of a viewer, when an Initialize or UpdateViewer event from the SCE is received by the viewer. When a viewer receives an Initialize event from the SCE, it first initializes its LastInputs and ViewerContext to defaults (step 710), then saves Estructured Log ID and viewer ID in ViewerContext (step 720) and, finally, sends a GetData event to the SCE to get data to display (step 730). When a viewer receives an UpdateViewer event from the SCE, it first verifies the viewer ID and Elog ID to see whether this event is for him (step 735). Then, the viewer gets Elog data and calls its ConstructView function to display data (step 740).

Figure 11A:
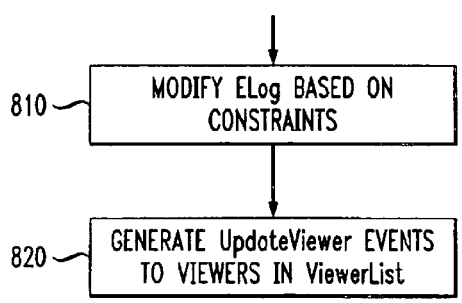
FIGS. 11A and 11B illustrate respective exemplary processes in a selection and control engine according to the invention when a constraint Elog event or a get data event from a viewer is received by the selection and control engine.
Figure 11B:
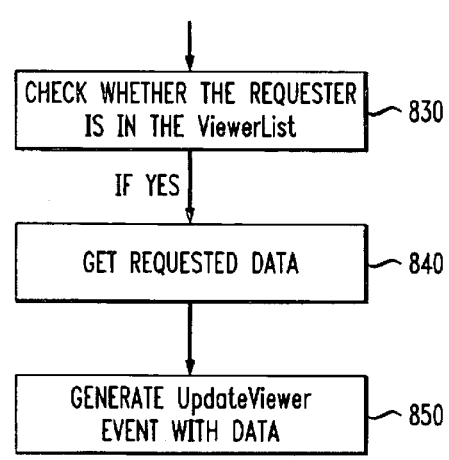

FIGS. 11A and 11B respectively illustrate exemplary processes in the SCE when ConstraintELog or GetData from a viewer is received by the SCE. When the SCE receives ConstraintELog from a viewer, it modifies Elog based on the constraint information in the event (step 810). Then, the SCE generates UpdateViewer events to all viewers in ViewList (step 820). When the SCE receives a GetData event from a viewer, it first checks whether the requester is qualified for getting the data, i.e., whether the viewer is in the ViewerList (step 830). Then, the SCE gets requested data through relational engine and generates an UpdateViewer event to the requester (step 850).

In the following description, we further describe three different types of viewers derived from the generic viewer (FIG. 8A) to support event summarization analysis 60, event graph analysis 40 and event message analysis 50 (FIG. 2A).

Figure 12:
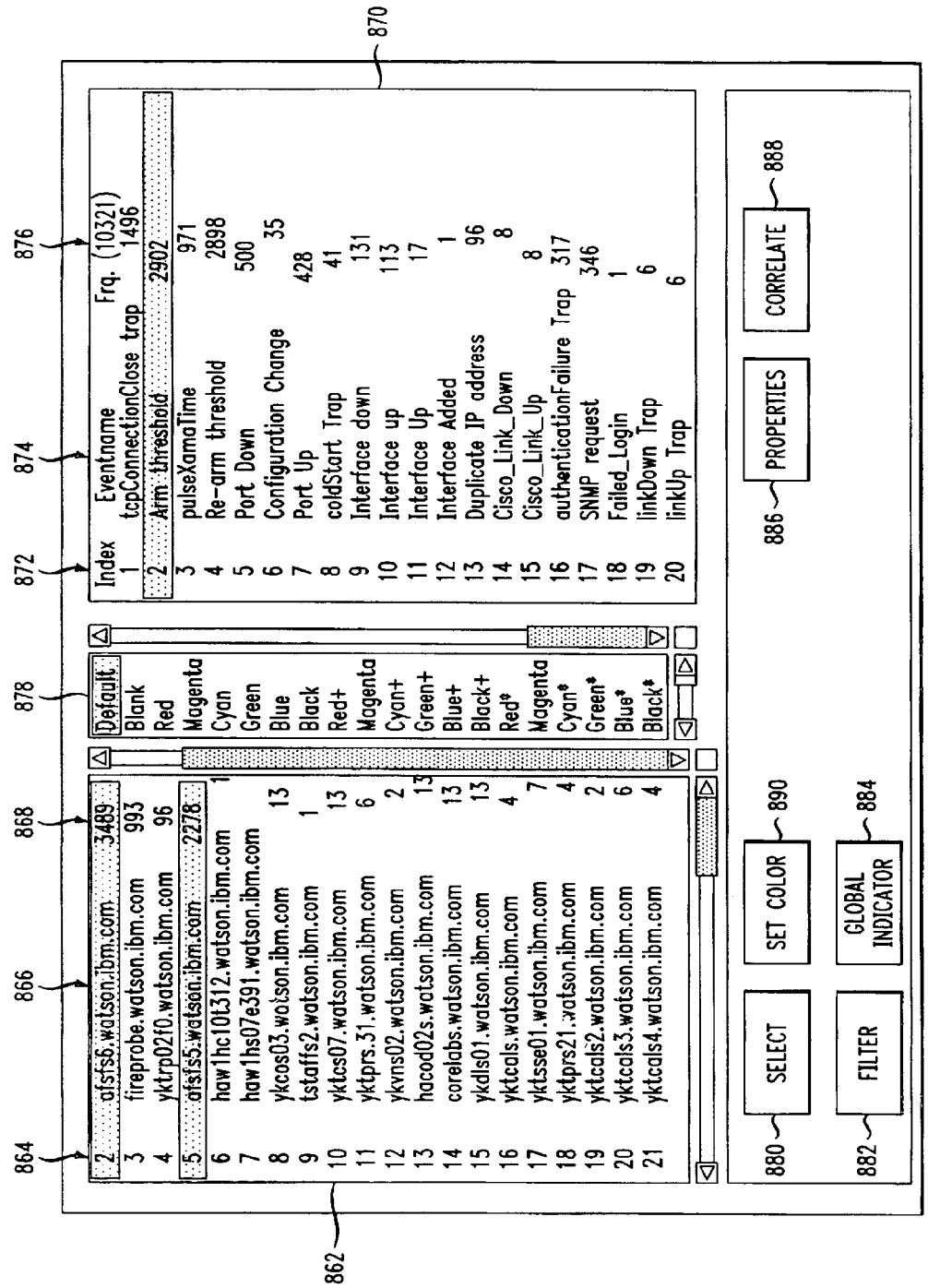
FIG. 12 illustrates an exemplary attribute viewer according to the invention.

FIG. 12 illustrates an exemplary attribute viewer according to the invention. The attribute viewer is designed to support event summarization analysis. It displays summarization information of attributes. A primary way that a user manipulates data from the attribute viewer is through highlighting items of attributes. Specifically, in FIG. 12, the left list box 862 shows a host name table. The three columns in the box are host ID (864), host name (866), and event count (868). The right side box 870 in FIG. 12 is an event type table. The three columns are event type ID (872), name of event type (874), and event count (876). The table 878 in the middle shows color codes. A color code can be assigned to any host and event type via a set color button 890. The attribute viewer defines select button 880 and a filter button 882 for selecting/filtering events constrained by highlighted attribute items. As is known, buttons are graphical symbols on a display whose operation may be implemented by clicking thereon with a mouse. For example, a user can select events related to a set of highlighted hosts and event types. This operation can be either global or local depending on whether a global indicator 884 is on or off. The attribute viewer also defines several local functions. Properties button 886 lets a user setup the appearance of the viewer and select which attributes to display. A correlate button 888 allows a user to correlate one attribute to another. For example, if a user highlights an "Arm threshold" event type in the event type table 870, as illustrated in FIG. 12, the correlate function finds all hosts having this event type and highlights these hosts in the host table 862.

Figure 13:
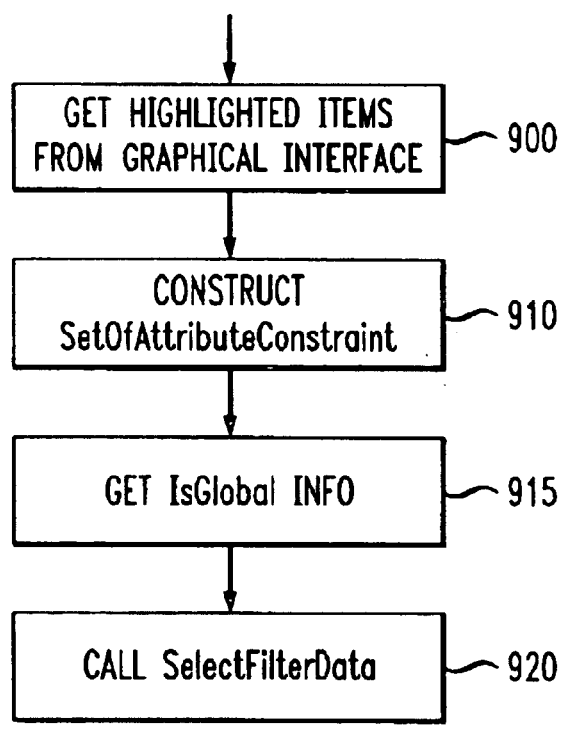
FIG. 13 illustrates an exemplary process associated with the activation of a select or filter button according to the invention.

We now further describe the processes of selection/filtering. FIG. 13 illustrates an exemplary process that occurs when the select button 880 or filter button 882 is pushed (activated). When the "Select" or "Filter" button is pushed by a user, the attribute viewer first gets highlighted items from the attribute tables (step 900). Then, the viewer defines SetOfAttributeConstraint based on the highlighted items (step 910). The viewer further gets the IsGlobal information, that is, determines if the global indicator 884 has been selected (step 915). Finally, the attribute viewer calls its SelectFilterData function with SetOfAttributeConstraint and IsGlobal as parameters (step 920). It is to be appreciated that selection (via a select button) generally refers to the operation where a user selects events of interest, while filtering (via a filter button) generally refers to the operation where a user excludes events that are not of interest.

Figure 14:
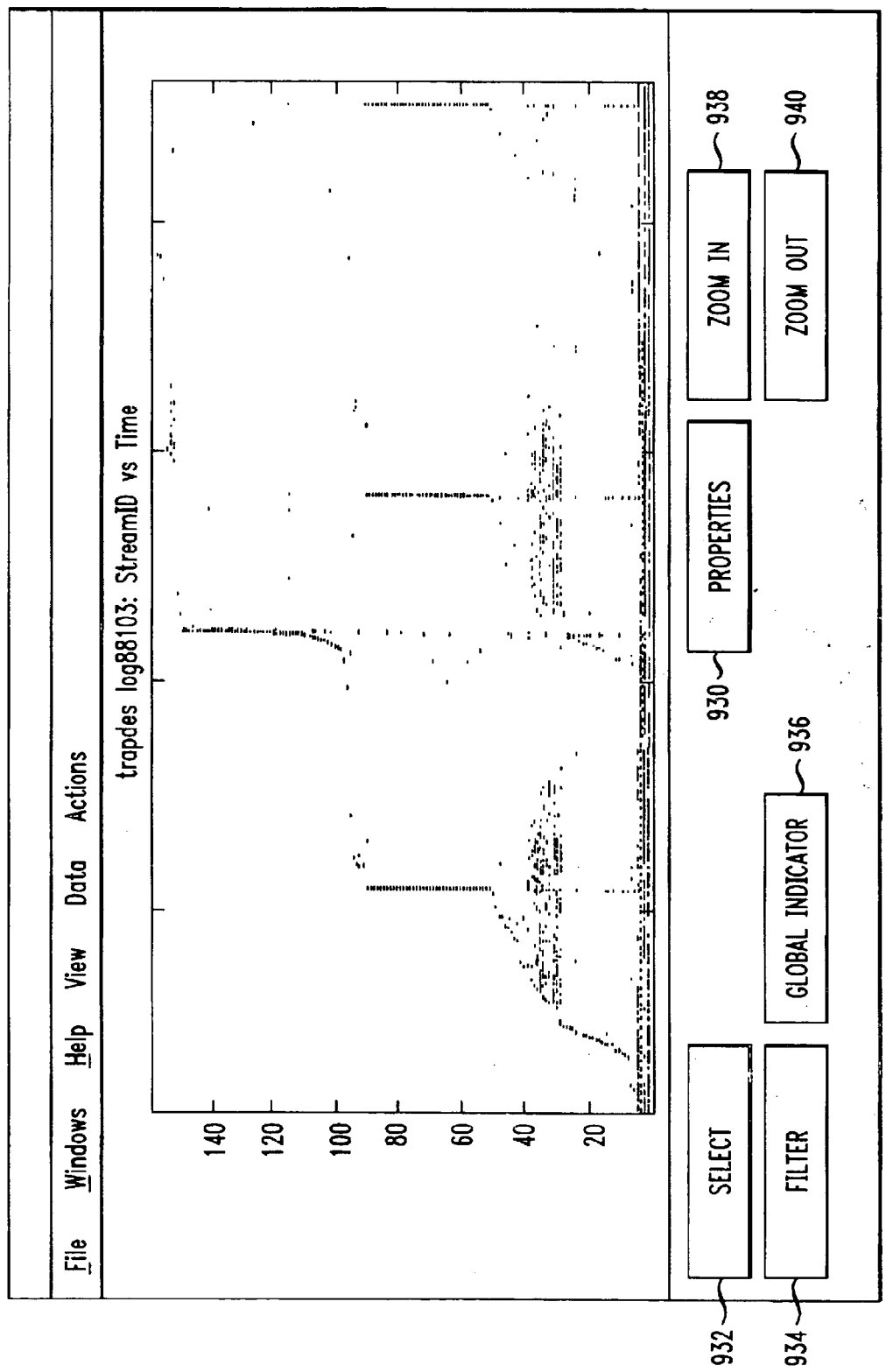
FIG. 14 illustrates an exemplary plot viewer according to the invention.

FIG. 14 illustrates an exemplary plot viewer according to the invention. The plot viewer is designed to support event graph analysis. A primary way for a user to manipulate data in the plot viewer is to rubber-band an area of interest. In this embodiment, the plot viewer is a two dimensional plot, which represents an event as a point using any two attributes of an event as two axes.

As an example, FIG. 14 plots host ID versus time. A "dot" at (x, y) in FIG. 14 corresponds to an event message, and represents that host y has an event at time x. The two axes can be changed to any attribute through the properties button 930. The plot viewer also supports selection and filtering operations; A user can use a rubber-band in FIG. 14 to select/filter a set of events through a select button 932 and a filter button 934, respectively. The select/filter operation can be global or local depending on a global indicator 936. A zoom in button 938 and a zoom out button 940 provide local zooming operations.

Figure 15:
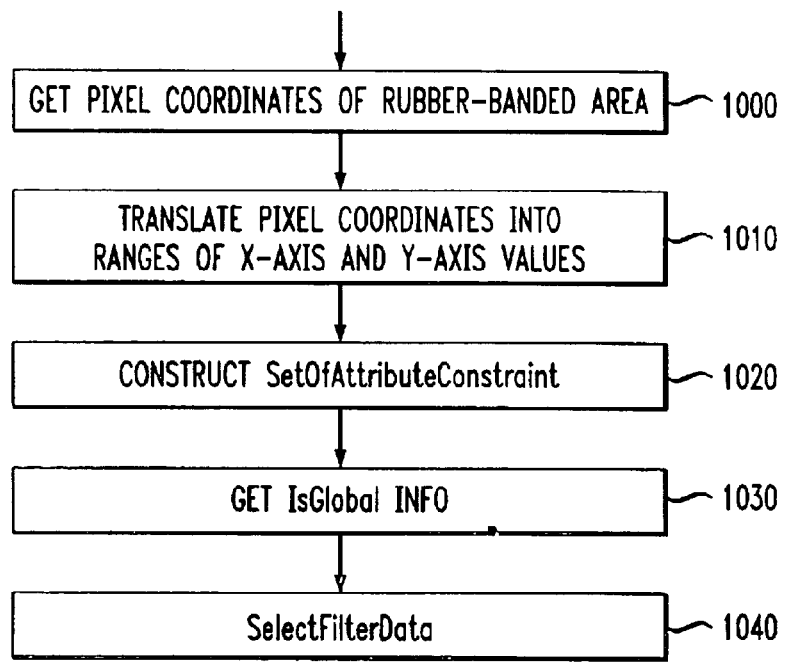
FIG. 15 illustrates an exemplary select/filter process according to the invention.

In the following description, we further describe the processes of select/filter and ConstructView. FIG. 15 illustrates an exemplary select/filter process. The select/filter process starts with getting pixel coordinates of the rubber-banded area (step 1000). Then, the pixel coordinates are translated into ranges of x-axis values and y-axis values (step 1010). Based on the properties of the plot (i.e., the attribute information of axes), SetOfAttributeConstraint is formed (step 1020). IsGlobal information is obtained in step 1030. Then, in step 1040, the event ConstraintELog is generated with SetOfAttributeConstraint and IsGlobal as parameters, and sent to the SCE.

Figure 16:
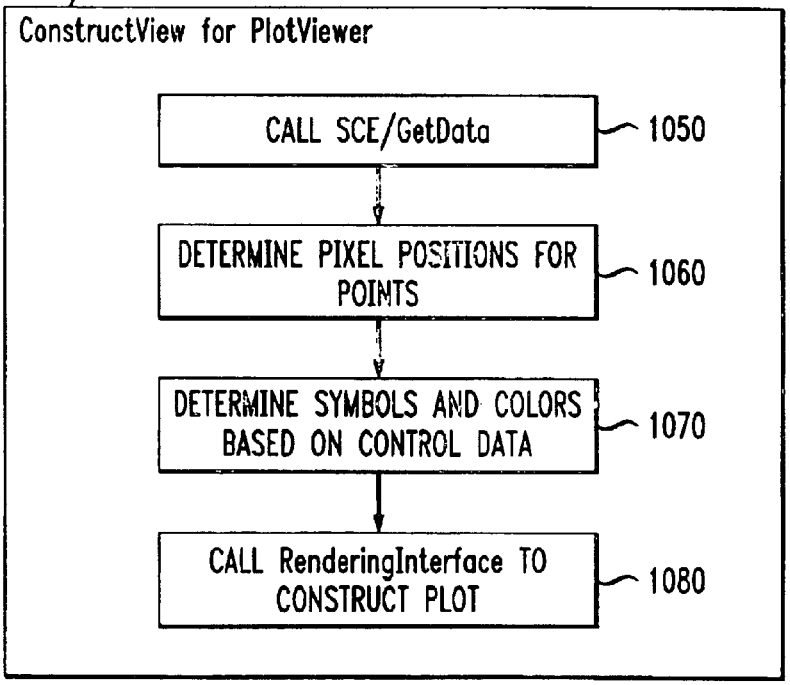
FIG. 16 illustrates an exemplary construct view process for a plot viewer according to the invention.

FIG. 16 illustrates an exemplary process of ConstructView for the plot viewer. In the process of ConstructView, a GetData event is first issued to the SCE to get data (step 1050). Upon receiving the data, the plot viewer determines pixel positions for each event (step 1060) and determines symbols and colors based on control data (step 1070). Then, the plot viewer calls the rendering interface 630 (FIG. 8A) to construct a plot (step 1080).

Figure 17:
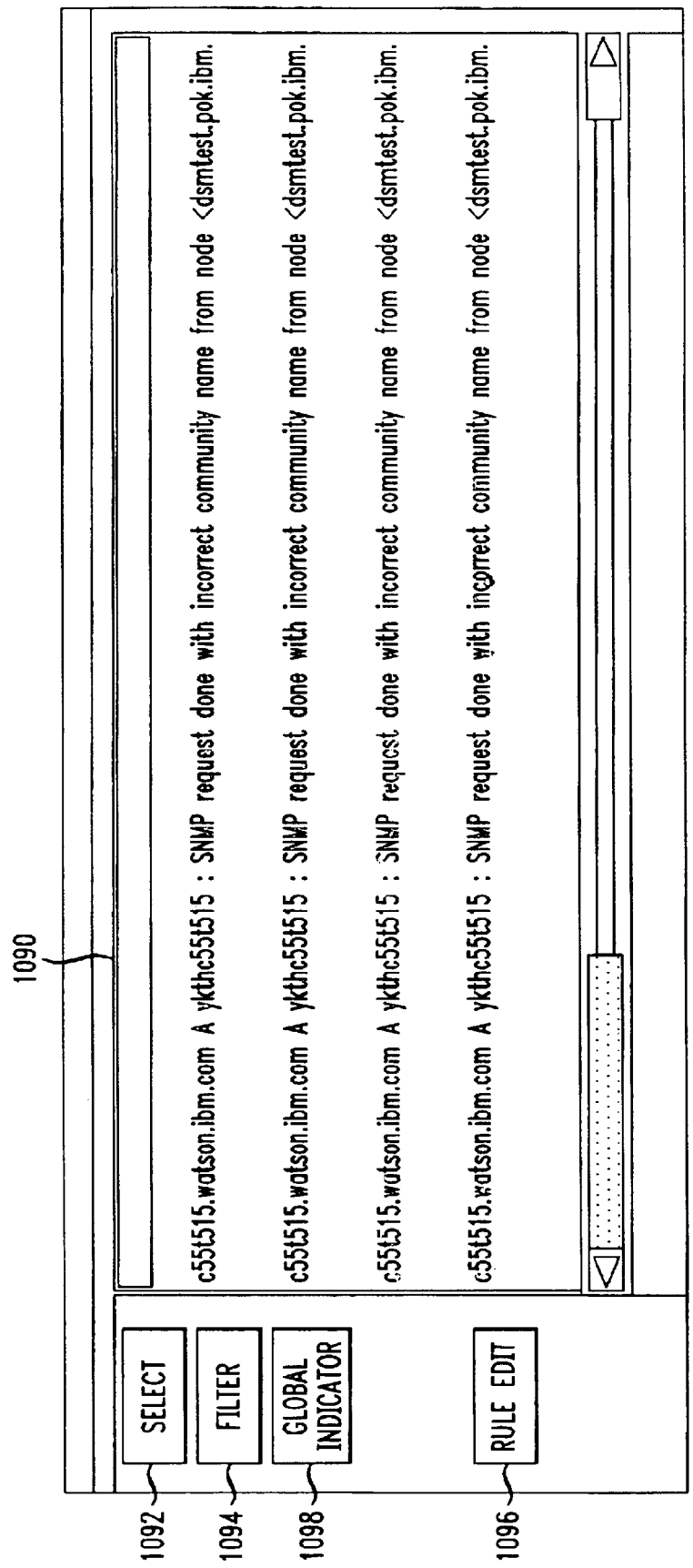
FIG. 17 illustrates an exemplary message viewer according to the invention.

FIG. 17 illustrates an exemplary message viewer according to the invention. The message viewer is designed to support raw message analysis. The user may view raw messages in window 1090. The message viewer supports selection and filtering operation based on string searching (select button 1092 and filter button 1094). In addition, the message viewer supports a parsing rule editing function through a rule edit button 1096. The message viewer also has a global indicator 1098.

Figure 18:
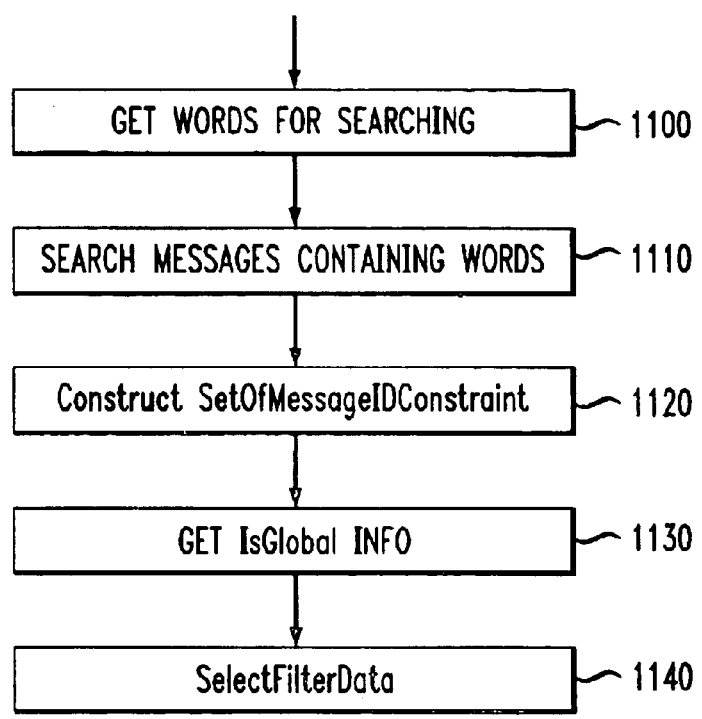
FIG. 18 illustrates an exemplary process associated with the activation of a select or filter button according to the invention.

FIG. 18 illustrates an exemplary process that occurs when the select button 1092 or the filter button 1094 is pushed. In the select/filter process in the message viewer, a user is first asked to input words to be searched (step 1100). Upon getting the response, the message viewer searches for messages containing the specified search words (step 110). Then, a set of message IDs is obtained for those matched messages and a SetOfMessageIDConstraint is constructed (step 1120). After getting IsGlobal information (step 1130), a SelectFilterData event is generated and sent to the SCE with SetOfMessageIDConstraint ans IsGlobal as parameters (step 1140).

Figure 19:
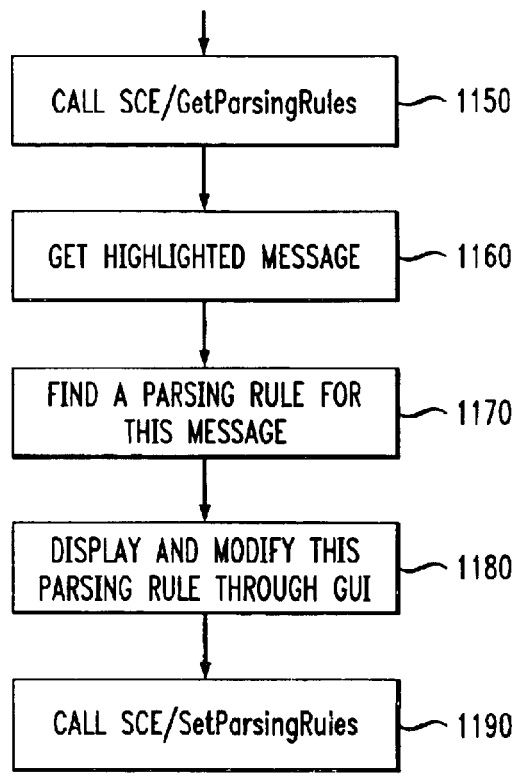
FIG. 19 illustrates an exemplary process of parsing rule editing according to the invention.

FIG. 19 illustrates an exemplary process of parsing rule editing. To edit parsing rules, the message viewer first gets parsing rules from the SCE (step 1150). The message viewer then gets highlighted messages (step 1160) and finds parsing rules suitable for these messages (step 1170). A user interacts with the message viewer via the GUI to modify the parsing rules found (step 1180) and the viewer then calls the SCE to write back the modified parsing rules thereto (step 1190).

Figure 20:
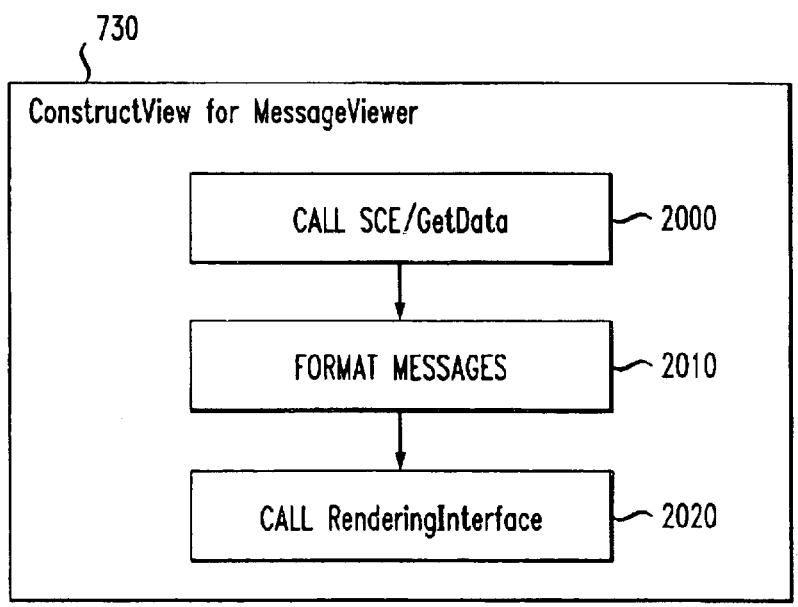
FIG. 20 illustrates an exemplary construct view process for a message viewer according to the invention.

FIG. 20 illustrates an exemplary process of ConstructView for the message viewer. When the message viewer needs to be constructed, it first calls the SCE to get data (step 2000). The message viewer then formats the received messages (step 2010). Finally, the message viewer calls its rendering interface 630 (FIG. 8B) to display messages (step 2020).

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A processor-based method for use in analyzing non-fully structured data which is associated with one or more events, the method comprising the steps of:

parsing at least a portion of the non-fully structured data according to one or more parsing rules to convert the at least a portion of non-fully structured data to structured data;

providing presentation operations which are respectively able to provide a presentation of at least a portion of the non-fully structured data, format at least a portion of the structured data to provide a presentation of a graphical representation of the at least a portion of structured data, and format at least a portion of the structured data to provide a presentation of a summary representation of the at least a portion of structured data; and coordinating data associated with two or more of the presentations, when desired, to enable a coordinated analysis of the data wherein at least a portion of the data associated with the two or more presentations is exchangeable in accordance with the two or more presentations.

2. The method of claim 1, further comprising the step of providing coordinated views for at least two of the graphical representation, the summary representation and the non-fully structured data presentation.

3. The method of claim 1, further comprising the step of modifying the one or more parsing rules to affect the parsing operation.

4. The method of claim 1, further comprising the step of providing a rubber-banding operation in association with the graphical representation.

5. The method of claim 1, further comprising the step of providing a zooming operation in association with the graphical representation.

6. The method of claim 1, wherein the summary representation includes one or more attributes associated with the at least a portion of structured data.

7. The method of claim 1, further comprising the step of providing a selection operation in association with aspects of at least one of the non-fully structured data and the structured data.

8. The method of claim 1, further comprising the step of providing a filtering operation in association with aspects of at least one of the non-fully structured data and the structured data.

9. A system for use in analyzing non-fully structured data which is associated with one or more events, the system comprising:

a parsing engine which parses at least a portion of the non-fully structured data according to one or more parsing rules to convert the at least a portion of non-fully structured data to structured data;

viewers which are respectively able to provide a presentation of at least a portion of the non-fully structured data, format at least a portion of the structured data to provide a presentation of a graphical representation of the at least a portion of structured data, and format at least a portion of the structured data to provide a presentation of a summary representation of the at least a portion of structured data, wherein data associated with two or more of the presentations is coordinated, when desired, to enable a coordinated analysis of the data wherein at least a portion of the data associated with the two or more presentations is exchangeable in accordance with the two or more presentations; and a selection and control engine coupled to the parsing engine and the viewers which controls operations associated with the parsing engine and the viewers.

10. The system of claim 9, wherein the operations controlled by the selection and control engine include at least one of data and parsing rule access.

11. The system of claim 9, wherein the operations controlled by the selection and control engine include communications between the viewers.

12. Apparatus for use in analyzing non-fully structured data which is associated with one or more events, the apparatus comprising:

at least one processor operable to: (i) parse at least a portion of the non-fully structured data according to one or more parsing rules to convert the at least a portion of non-fully structured data to structured data; (ii) provide presentation operations which are respectively able to provide a presentation of at least a portion of the non-fully structured data, format at least a portion of the structured data to provide a presentation of a graphical representation of the at least a portion of structured data, and format at least a portion of the structured data to provide a presentation of a summary representation of the at least a portion of structured data; and (iii) coordinate data associated with two or more of the presentations, when desired, to enable a coordinated analysis of the data wherein at least a portion of the data associated with the two or more presentations is exchangeable in accordance with the two or more presentations; and memory coupled to the at least one processor for storing at least one of the non-fully structured data, the structured data and the one or more parsing rules.

13. The apparatus of claim 12, wherein the at least one processor is further operable to provide coordinated views for at least two of the graphical representation, the summary representation and the non-fully structured data presentation.

14. The apparatus of claim 12, wherein the at least one processor is further operable to modify the one or more parsing rules to affect the parsing operation.

15. The apparatus of claim 12, wherein the at least one processor is further operable to provide a rubber-banding operation in association with the graphical representation.

16. The apparatus of claim 12, wherein the at least one processor is further operable to provide a zooming operation in association with the graphical representation.

17. The apparatus of claim 12, wherein the summary representation includes one or more attributes associated with the at least a portion of structured data.

18. The apparatus of claim 12, wherein the at least one processor is further operable to provide a selection operation in association with aspects of at least one of the non-fully structured data and the structured data.

19. The apparatus of claim 12, wherein the at least one processor is further operable to provide a filtering operation in association with aspects of at least one of the non-fully structured data and the structured data.

20. An article of manufacture for use in analyzing non-fully structured data which is associated with one or more events, comprising a machine readable medium containing one or more programs which when executed implement the steps of:

parsing at least a portion of the non-fully structured data according to one or more parsing rules to convert the at least a portion of non-fully structured data to structured data;

providing presentation operations which are respectively able to provide a presentation of at least a portion of the non-fully structured data, format at least a portion of the structured data to provide a presentation of a graphical representation of the at least a portion of structured data, and format at least a portion of the structured data to provide a presentation of a summary representation of the at least a portion of structured data; and coordinating data associated with two or more of the presentations, when desired, to enable a coordinated analysis of the data wherein at least a portion of the data associated with the two or more presentations is exchangeable in accordance with the two or more presentations.

\* \* \* \* \*